(12) United States Patent
Wang et al.

(10) Patent No.: US 12,293,142 B2
(45) Date of Patent: **\*May 6, 2025**

(54) STYLE TRANSFER

(71) Applicant: Microsoft Technology Licensing, LLC, Redmond, WA (US)

(72) Inventors: Jinpeng Wang, Redmond, WA (US); Chin-Yew Lin, Redmond, WA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/106,802

(22) Filed: Feb. 7, 2023

(65) Prior Publication Data

US 2023/0252220 A1 Aug. 10, 2023

Related U.S. Application Data

(63) Continuation of application No. 17/431,377, filed as application No. PCT/US2020/016309 on Feb. 3, 2020, now Pat. No. 11,580,292.

(30) Foreign Application Priority Data

Mar. 4, 2019 (CN) .......................... 201910161417.9

(51) Int. Cl.
*G06F 40/00* (2020.01)
*G06F 40/103* (2020.01)
(Continued)

(52) U.S. Cl.
CPC .......... *G06F 40/103* (2020.01); *G06F 40/177* (2020.01); *G06T 11/206* (2013.01); *G06V 30/40* (2022.01)

(58) Field of Classification Search
CPC ..... G06F 40/103; G06F 40/177; G06T 11/206
See application file for complete search history.

(56) References Cited

U.S. PATENT DOCUMENTS 6,871,319 B2 \* 3/2005 Taboada ................ G06F 40/177
715/204
7,747,944 B2 \* 6/2010 Gerhard ................ G06T 11/206
715/236
(Continued)

FOREIGN PATENT DOCUMENTS

| CN | 108921894 A | 11/2018 |
|---|---|---|
| JP | 2018132855 A | 8/2018 |
| WO | 2018020462 A1 | 2/2018 |

OTHER PUBLICATIONS

"Office Action Issued in Indian Patent Application No. 202117038723", dated Jul. 12, 2023, 7 Pages.
(Continued)

*Primary Examiner* — Barbara M Level
(74) *Attorney, Agent, or Firm* — Schwegman Lundberg & Woessner, P.A.

(57) ABSTRACT

Various implementations of the present disclosure relate to style transfer. In some implementations, a computer-implemented method comprises: obtaining a target object having a first style, a style of the target object being editable; obtaining a reference image including a reference object; obtaining a second style of the reference object, the second style of the reference object being extracted from the reference image; and applying the second style to the target object.

18 Claims, 6 Drawing Sheets

(51) Int. Cl.
   *G06F 40/177* (2020.01)
   *G06T 11/20* (2006.01)
   *G06V 30/40* (2022.01)

(56) References Cited

U.S. PATENT DOCUMENTS

| | | | | |
|---|---|---|---|---|
| 10,664,963 | B1* | 5/2020 | Rossi | G06V 10/82 |
| 10,825,132 | B2* | 11/2020 | Rainy | G06T 3/10 |
| 11,043,013 | B2* | 6/2021 | Jung | H04N 5/00 |
| 11,580,292 | B2 | 2/2023 | Wang et al. | |
| 2007/0162848 | A1* | 7/2007 | Mansfield | G06V 30/416 |
| | | | | 715/234 |
| 2009/0235152 | A1* | 9/2009 | Rampson | G06T 11/206 |
| | | | | 715/207 |
| 2011/0080408 | A1* | 4/2011 | Neelakantan | G06T 11/206 |
| | | | | 345/440 |
| 2013/0093782 | A1* | 4/2013 | Wakefield | G06T 11/206 |
| | | | | 345/589 |
| 2013/0187926 | A1* | 7/2013 | Silverstein | G06F 16/116 |
| | | | | 345/440 |
| 2014/0165037 | A1* | 6/2014 | Brun | G06F 9/451 |
| | | | | 717/122 |
| 2016/0012129 | A1* | 1/2016 | Rampson | G06F 40/18 |
| | | | | 707/722 |
| 2016/0055659 | A1* | 2/2016 | Wilson | G06F 3/04842 |
| | | | | 345/440 |
| 2017/0139572 | A1 | 5/2017 | Sunkavalli et al. | |
| 2018/0150947 | A1* | 5/2018 | Lu | G06T 11/001 |
| 2018/0260668 | A1* | 9/2018 | Shen | G06V 10/82 |
| 2018/0357800 | A1* | 12/2018 | Oxholm | G06T 11/001 |
| 2019/0026870 | A1* | 1/2019 | Hu | G06T 5/77 |
| 2019/0087982 | A1* | 3/2019 | Matsumoto | G06T 7/13 |
| 2019/0244060 | A1* | 8/2019 | Dundar | G06T 15/00 |
| 2019/0244329 | A1* | 8/2019 | Li | G06N 3/088 |
| 2019/0279075 | A1* | 9/2019 | Liu | G06N 3/047 |
| 2019/0370936 | A1* | 12/2019 | Zhang | G06F 18/213 |
| 2020/0226724 | A1* | 7/2020 | Fang | G06V 10/7715 |
| 2023/0316604 | A1* | 10/2023 | Cui | G06T 11/206 |
| | | | | 345/440.2 |

OTHER PUBLICATIONS

"First Office Action and Search Report Issued in Chinese Patent Application No. 201910161417.9", dated Apr. 3, 2023, 13 Pages.
"Office Action Issued in European Patent Application No. 20708391.6", dated Jul. 20, 2023, 4 Pages.
"Notice of Allowance Issued in Chinese Patent Application No. 201910161417.9", dated Aug. 11, 2023, 4 Pages.
Li, et al., "Synthesizing data for text recognition with style transfer", Multimedia Tools and Applications, vol. 78, Sep. 15, 2018, pp. 29183-29196.
Office Action Received for Japanese Application No. 2021-546228, mailed on Nov. 22, 2023, 5 Pages (English Translation Provided).
Sun, et al., "Learning to Write Stylized Chinese Characters by Reading a Handful of Examples", Arxiv Cornell University, vol. 3, Jun. 18, 2018, pp. 920-927.
Decision to Grant a Patent received in Japanese Application No. 2021-546228, mailed on May 7, 2024, 5 pages (English Translation Provided).
Intimation of Grant received for Indian Application No. 202117038723, mailed on Aug. 30, 2024, 1 page.

* cited by examiner

STYLE TRANSFER

CROSS-REFERENCE TO RELATED APPLICATION

This application is a continuation of U.S. Ser. No. 17/431,377, filed Aug. 16, 2021, which is a U.S. National Stage Filing under 35 U.S.C. 371 of International Patent Application Serial No. PCT/US2020/016309, filed Feb. 3, 2020, and published as WO 2020/180437 A1 on Sep. 10, 2020, which claims priority to Chinese Application No. 201910161417.9, filed Mar. 4, 2019, which applications and publication are incorporated herein by reference in their entirety.

BACKGROUND

Editable objects like charts and tables have an important role in daily life. However, while using these editable objects, users often feel confused or difficult to decide what kind of design or style (e.g., color and layout etc.) should be used. In addition, even if users know the design or style to be used, they cannot quickly apply such style. Instead, users need to adjust the respective elements in the editable objects according to each style element and time cost of such operation is quite high.

SUMMARY

Various implementations of the present disclosure provide a style transfer solution for the editable objects (e.g., charts, tables and the like). In some implementations, a target object having a first style may be obtained, the style of the target object being editable. A reference image comprising a reference object may be obtained. A second style of the reference object may be obtained, the second style of the reference object being extracted from the reference image. The second style may be applied to the target object.

This Summary is provided to introduce a selection of concepts in a simplified form that are further described below in the Detailed Description. This Summary is not intended to identify key features or essential features of the subject matter, nor is it intended to be used to limit the scope of the subject matter.

BRIEF DESCRIPTION OF THE DRAWINGS

In these drawings, same or similar reference signs indicate same or similar elements.

DETAILED DESCRIPTION OF EMBODIMENTS

The present disclosure will now be discussed with reference to several example implementations. It is to be understood these implementations are discussed only for the purpose of enabling those skilled persons in the art to better understand and thus implement the present disclosure, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
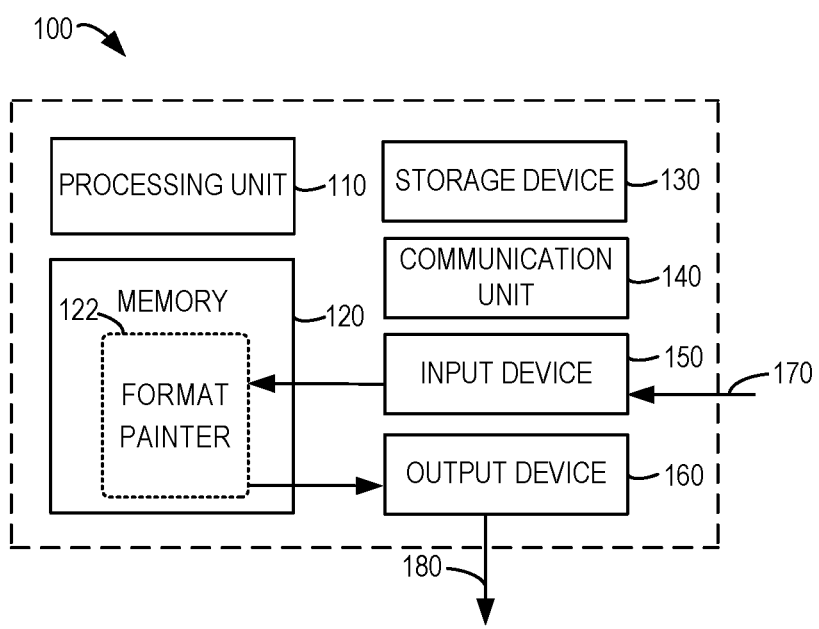
FIG. 1 is a block diagram illustrating a computing device for implementing various implementations of the present disclosure.

Basic principles and several example implementations of the present disclosure are explained below with reference to the drawings. FIG. 1 illustrates a block diagram of a computing device 100 that can carry out a plurality of implementations of the present disclosure. It should be understood that the computing device 100 shown in FIG. 1 is only exemplary and shall not constitute any restrictions over functions and scopes of the implementations described by the present disclosure. According to FIG. 1, the computing device 100 includes a computing device 100 in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), anon-volatile memory (such as, Read-Only Memory (ROM), Electrically Erasable Programmable Read-Only Memory (EEPROM), flash), or any combinations thereof. The memory 120 can include a format painter 122 configured to execute functions of various implementations described herein. The format painter 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the present disclosure. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 can be used for implementing the style transfer solution according to implementations of the present disclosure. Here, editable objects refer to target objects with editable style, e.g., charts or tables generated within presentation applications, text-processing applications and/or spreadsheet applications. For example, the style of the chart can include color, pattern, border, shading, coordinates and the like. Different from the general format which reflects a single or a particular element of the appearance, the "style" of the editable object represents an overall appearance of the object and is often embodied by different appearance elements. For example, the "style" of the editable object contains elements, such as color, pattern, border, shading and coordinates manifesting the overall appearance and/or layout of the object.

In some implementations, the editable objects also can be documents generated by the presentation application, the text-processing application and/or the spreadsheet application. For example, as editable objects, the style of these documents can embody font, size, line spacing, indentation, background and layout etc.

During the style transfer of the editable objects (e.g., charts or tables), the computing device 100 can receive, via the input device 150, a reference image 170, which can include a reference object, such as a chart. A format painter 122 can process the reference image 170 and extract a style of the reference object in the reference image 170. In addition, the computing device 100 can receive, via the input device 150, an editable object, which may be a chart or table. For example, the extracted style of the reference object can be applied to the editable object to modify its style. The modified editable object can be provided to the output device 160 and then further to the user as an output 180. For example, the modified editable object can be shown on a display and presented for the user.

Figure 2:
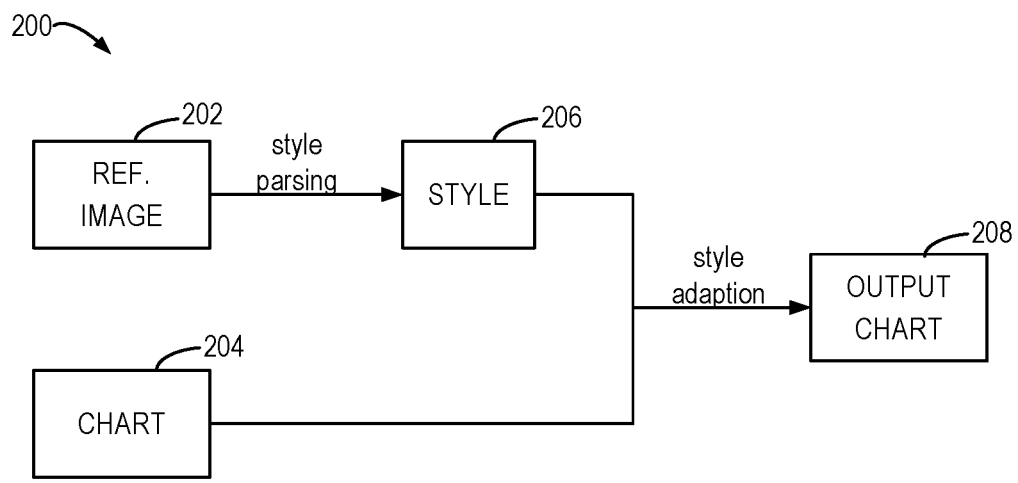
FIG. 2 illustrates a schematic diagram of architecture for style transfer in accordance with some implementations of the present disclosure.

Example implementations of the present disclosure will be described in details below with reference to FIGS. 2-5. FIG. 2 illustrates a schematic diagram of architecture 200 for style transfer in accordance with some implementations of the present disclosure. A formant painter 122 can be implemented at least partially by the architecture 200. It should be appreciated that FIG. 2 is provided for the purpose of illustration only and is not intended to limit the scope of the present disclosure. One or more modules in the architecture 200 for style transfer can be combined into a module, one or more modules can be added into the architecture 200 for style transfer, one or more modules of the architecture 200 for style transfer can be replaced and/or the like, without departing from the spirit and the scope of the present disclosure.

The user can import a reference image 202 from the local computing device or can obtain a reference image 202 from the network, for example, providing a link of the reference image 202. The reference image 202 may not be editable and includes a reference object, such as a chart. For the sake of convenience, the object will be described below with reference to charts. However, it should be understood that the principle of the present disclosure also can be applied to other objects like tables.

The reference image 202 is style parsed to obtain a style of the reference object therein. For example, the style of the reference image 202 can be parsed at the local computing device. Alternatively, the reference image 202 can be uploaded to a server (e.g., cloud), which parses the style of the reference image 202 and then provides the parsed to the local device. After a style 206 of the reference object is obtained, the style 206 is applied to a chart 204 having a predefined style. The chart 204 can be generated by a presentation application, a text-processing application and/or a spreadsheet application. The style of the chart 204 is modified to or replaced by the style 206, so as to obtain an output chart 208 having the style 206.

In some implementations, the style parsing can be performed by a predefined rule. Taking a bar chart as an example, a color having the largest area in the reference image 202 can be considered as a background color and a color having the second largest area is considered as a color for a bar in the bar chart. Based on a rule-based model, the style can be extracted at the cost of lower computing resources and the response time of the style transfer is reduced accordingly, which will be favorable to the implementation of the offline style transfer on limited computing resources.

Figure 3:
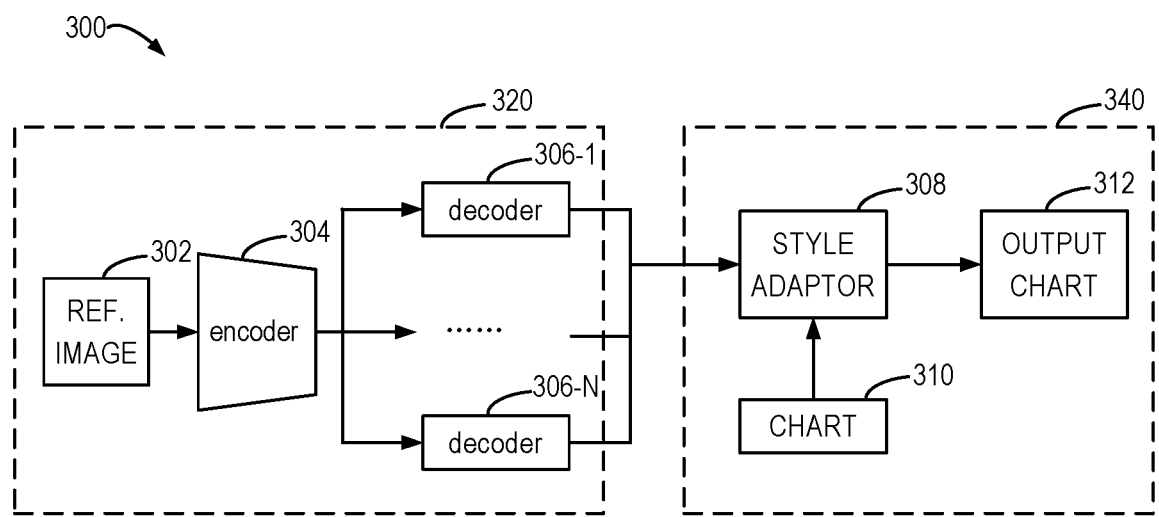
FIG. 3 illustrates a schematic diagram of a model for style transfer in accordance with some implementations of the present disclosure.

In some implementations, the style parsing can be implemented by a neural network. For example, FIG. 3 illustrates a schematic diagram of a neural network model 300 for style transfer in accordance with some implementations of the present disclosure. As shown in FIG. 3, the neural network model 300 includes a style parsing portion 320 for parsing or extracting the style of the reference chart in the reference image and a style adapting portion 340 for applying the parsed or extracted style into the target chart. The style parsing portion 320 can be trained based on a large-scale data set for extracting the style of an image or an object.

In the style parsing portion 320, the reference image 302 is provided to an encoder 304 to convert the reference image 302 into a representation of the reference image 302, e.g., vector representation. For example, the encoder 304 can be implemented by a Convolutional Neural Network (CNN).

The style can include a plurality of style elements, like color, pattern, background, border, shading and display/non-display of numerical values etc. Therefore, a decoder can be used to decode a corresponding style element. As shown in FIG. 3, the decoders 306-1 to 306-N are used for decoding N different style elements respectively to obtain various style elements. For example, the decoder 306-1 can obtain a color-related style element, which outputs a color sequence. The style elements outputted by decoders 306-1 to 306-N can be combined together as a parsed style, which is then outputted to the style adapting portion 340.

In some implementations, an object detecting module (not shown) can be added in the style parsing portion 320 to detect various parts (such as background, bar and the like) in the reference chart (e.g., bar chart). The output of the object detecting module can be provided to the decoder to better extract features of the reference chart. For example, a part corresponding to the background in the feature vectors of the encoder 304 can be provided to the decoder that extracts background-related information. In this way, related style elements of the reference chart can be extracted more efficiently.

In some implementations, functions corresponding to some of the decoders can be replaced by the rule-based model to boost the computing efficiency. For example, color may be one of the style elements with the highest computing complexity for charts. Therefore, in order to boost the computing efficiency, the style element of color can be implemented by the rule-based model.

As shown in FIG. 3, the style adapting portion 340 includes a style adapter 308, which applies the style obtained from the style parsing portion 320 into the chart 310 having a predefined style. The predefined style of the chart 310 is modified into the style extracted from the reference image 302 to obtain the output chart 312. The output chart 312 can be shown on a display, such that the user can operate the style of the output chart 312 to further modify or edit the style of the output chart 312. The user can trim or tune the output chart 312 to improve the display effect of the output chart 312.

Figure 4:
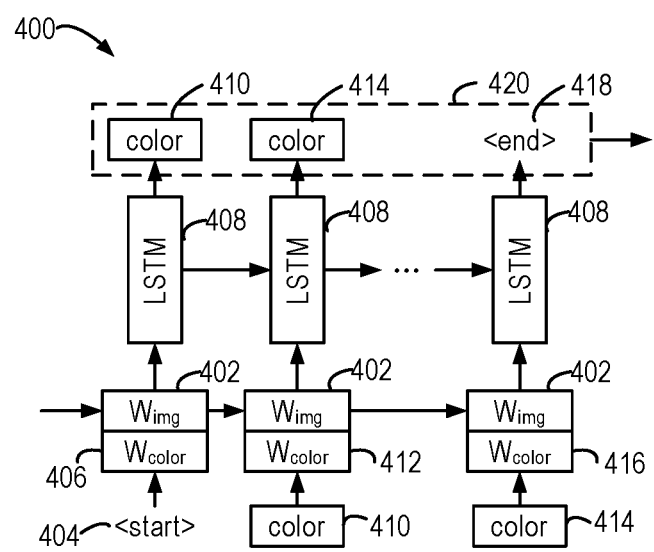
FIG. 4 illustrates a schematic diagram of a decoder in accordance with some implementations of the present disclosure.

FIG. 4 illustrates a schematic diagram of a decoder 400 in accordance with some implementations of the present disclosure. The decoder 400 can be applied into any of the decoders 306-1 to 306-N shown in FIG. 3. However, it should be understood that the decoders 306-1 to 306-N shown in FIG. 3 also can be implemented by any other suitable models.

The decoder 400 receives, from the encoder, a representation 406 of the reference image, which representation is provided to a recurrent neural network 408 together with a vector representation 406 of a start tag 404. The recurrent neural network 408 is a Long Short-Term Memory (LSTM) in this example. However, it should also be understood that any other suitable networks can also be employed as substitution, such as Gated Recurrent Unit (GRU) and the like. The recurrent neural network 408 outputs a first color 410 and provides a representation 412 of the first color 410 and a representation 406 of the reference image together to the recurrent neural network 408 for next iteration to obtain a second color 414. A representation of the second color 414 and the representation 406 of the reference image are provided to the recurrent neural network 408 for next iteration, so as to obtain an end tag 418. An output 420 of a sequence including these colors is provided to a subsequent processing module for further processing.

Figure 5:
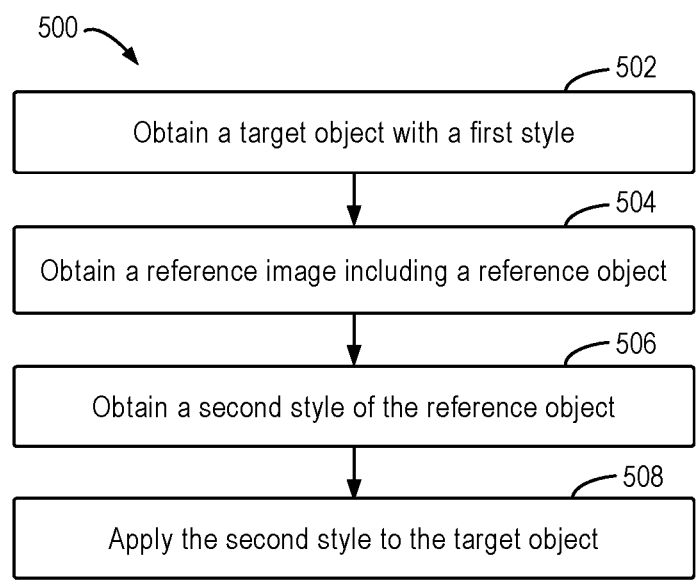
FIG. 5 illustrates a flowchart of a method for style transfer in accordance with some implementations of the present disclosure.

FIG. 5 illustrates a flowchart of a method 500 for style transfer in accordance with some implementations of the present disclosure. For example, the method 500 can be implemented by the computing device 100 and also can be implemented in the example architecture and example models demonstrated in FIGS. 2-4.

At 502, a target object having a first style is obtained. The style of the target object is editable. For example, the target object can include at least one of chart and table.

At 504, a reference image including a reference object is obtained. For example, the reference object can include a chart and/or a table. The reference object and the target object can have same or different type. For example, the reference object can be a bar chart while the target object can be a bar chart or a pie chart.

At 506, a second style of the reference object is obtained and the second style of the reference object is extracted from the reference image. In some implementations, the second style of the reference object can be extracted through the predefined rule.

In some implementations, the second style of the reference object can be extracted from the reference image via a neural network. For example, the reference image is converted, via the encoder, into a representation of the reference image and the representation of the reference image is converted, via the decoder, into the style of the reference image. For example, the representation of the reference image is converted into a plurality of elements of the style via a plurality of decoders, respectively.

At 508, the second style is applied to the target object. For example, the second style can differ from the first style. The style represents a combination of multiple various elements. If one element in the second style differs from the first style, the two styles are different. In this way, the first style is modified into the second style. In some implementations, a target object having the second style is displayed. In response to receiving an editing operation on the target object having the second style, the second style of the target object can be modified. In this case, the user can further modify the style of the target object. Alternatively, in some cases, the second style may be the same as the first style. Thus, when the second style is applied to the target object, the style of the target object does not change.

Figure 6:
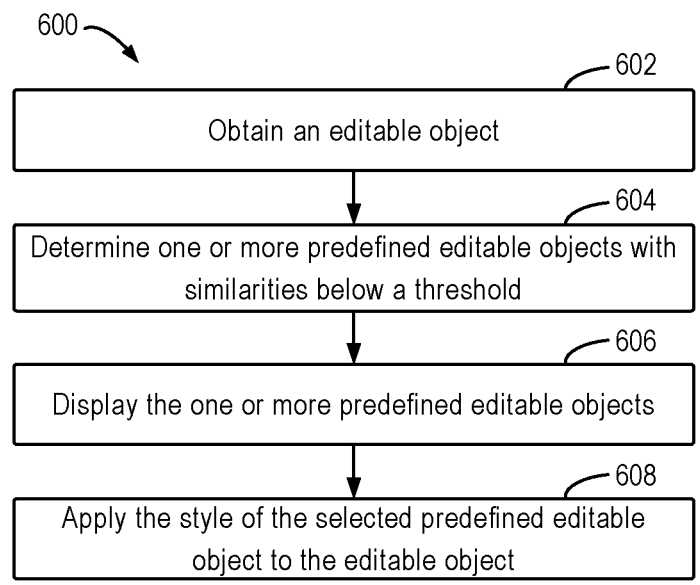
FIG. 6 illustrates a flowchart of another method for style transfer in accordance with some implementations of the present disclosure.

The solution of transferring the style in the reference image to the editable object has been described above with reference to FIGS. 2-5. In some implementations, the style of one editable object can be transferred to another editable object. FIG. 6 illustrates a flowchart of a method 600 for transferring a style of an editable object to another editable object in accordance with some implementations of the present disclosure. The method 600 can be implemented by the computing device 100.

At 602, an editable object is obtained. The editable object may be associated with a data set. For example, an editable object can be generated based on the associated data, or an editable object can be copied from an editable object generated by another tool. The editable object can be a chart for visualizing the data set or the table including the data set. The editable object also can be the chart drawn based on the data set, e.g., a bar chart. For the sake of convenience, the editable object is hereinafter referred to as the target editable object and the corresponding data set is referred to as the target data set.

At 604, one or more predefined editable objects whose similarity with the target editable object is below a predefined threshold are determined from a plurality of predefined editable objects. The predefined editable objects have respective styles, which can be the styles matching the data at a higher aesthetic degree. The similarity can be measured in various suitable ways. For example, the similarity between two data can be measured by size of data amount, the number of rows, the number of columns and size of the data value etc.

Furthermore, semantic information associated with the target editable object (e.g., chart) also can be considered. For example, the similarity between the target editable object and the predefined editable object can be determined based on the text content in the chart. For example, if the title of the chart contains "percentage," the chart is more suitable to be displayed in the form of a pie chart and the chart is more similar to a pie chart. In this way, the recommended style may differ from the original type of the target editable object. In another example, the similarity in subject matter of the charts also can be considered. For example, the subject matter of the input chart can be obtained or derived based on the title of the input chart and tags of rows or columns of the data, and the subject matter of the input chart is compared to the similar subject matter of the predefined charts.

In some implementations, a plurality of predefined editable objects can be associated with a plurality of various categories, such as science category, finance category and the like. In such case, one or more data sets whose similarity with the target data set is below a predefined threshold can be respectively determined from the plurality of categories. Thus, styles in various categories can be recommended to the users.

At 606, the one or more predefined editable objects are displayed for user selection. Alternatively or additionally, the style corresponding to the data set with the highest similarity can be directly applied into the target editable object. Such a style can be automatically displayed after obtaining the editable object. Alternatively, the style can also be displayed after the user clicks a certain button or interface element.

At 608, in response to receiving a selection of one of the one or more predefined editable objects, the style of the editable object is applied to the target editable object.

In this way, some better styles can be conveniently recommended to the user for them to choose, thereby enhancing the convenient level of the style transfer.

Some example implementations of the present disclosure are listed below.

In a first aspect, there is provided a computer-implemented method. The method comprises obtaining a target object having a first style, the style of the target object being editable; obtaining a reference image comprising a reference object; obtaining a second style of the reference object, the second style of the reference object being extracted from the reference image; and applying the second style to the target object.

In some implementations, the second style of the reference object is extracted from the reference image by a neural network.

In some implementations, the reference image is converted to a representation of the reference image by an encoder, and wherein the representation of the reference image is converted to the second style of the reference object by a decoder.

In some implementations, the representation of the reference image is converted to a plurality of elements of the second style by a plurality of decoders, respectively.

In some implementations, the second style of the reference object is extracted by a predefined rule.

In some implementations, the reference object and the target object each include at least one of chart and table.

In some implementations, the method further comprises displaying the target object having the second style; and in response to receiving an editing operation on the displayed target object having the second style, modifying the second style of the target object.

In a second aspect, there is provided a device comprising: a processing unit; and a memory coupled to the processing unit and including instructions stored thereon, the instructions, when executed by the processing unit, causing the device to perform acts comprising: obtaining a target object having a first style, the style of the target object being editable; obtaining a reference image comprising a reference object; obtaining a second style of the reference object, the second style of the reference object being extracted from the reference image; and applying the second style to the target object.

In some implementations, the second style of the reference object is extracted from the reference image by a neural network.

In some implementations, the reference image is converted to a representation of the reference image by an encoder, and wherein the representation of the reference image is converted to the second style of the reference object by a decoder.

In some implementations, the representation of the reference image is converted to a plurality of elements of the second style by a plurality of decoders, respectively.

In some implementations, the second style of the reference object is extracted by a predefined rule.

In some implementations, the reference object and the target object each include at least one of chart and table.

In some implementations, the acts further comprise: displaying the target object having the second style; and in response to receiving an editing operation on the displayed target object having the second style, modifying the second style of the target object.

In a third aspect, the present disclosure provides a computer program product tangibly stored in a non-transitory computer storage medium and including computer-executable instructions, the computer-executable instructions, when executed by a device, causing the device to perform the method in the first aspect of the present disclosure.

In a fourth aspect, the present disclosure provides a computer-readable storage medium stored thereon with computer-executable instructions, the computer-executable instructions, when executed by a device, causing the device to perform the method in the first aspect of the present disclosure.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A system comprising:
    at least one processor; and
    memory comprising instructions that, when executed by the at least one processor, cause the at least one processor to perform operations to:
        obtain a target editable object, from a presentation computer application, the target editable object associated with a first data set;
        calculate a similarity measure for a plurality of predefined editable objects through comparison of the plurality of predefined editable objects to the target editable object, each predefined editable object of the plurality of predefined editable objects associated with a second data set, wherein the similarity is measured based on data of the first data set and the second data set, semantic information associated with the first data set and the second data set, or categories of the first data set and the second data set;
        identify one or more predefined editable objects from the plurality of predefined editable objects based on a similarity measurement of the one or more predefined editable objects being outside a threshold similarity measure;
        extract a style of the one or more predefined editable objects by a style parser of a neural network;
        output the one or more predefined editable objects in a user interface of the presentation computer application; and
        upon receipt of a selection of the one or more predefined editable objects, apply the style of the one or more predefined editable objects to the target editable object by a style adapter of the neural network in an application window of the presentation computer application, wherein the style of the one or more predefined editable objects comprises at least one visual display characteristic.

2. The system of claim 1, the memory further comprising instructions that, when executed by the at least one processor, cause the at least one processor to perform operations to generate the target editable object from the data set.

3. The system of claim 1, wherein the target editable object is an electronic chart that comprises a visualization of the data set.

4. The system of claim 1, wherein a predefined editable object of the plurality of predefined editable objects has a respective style.

5. The system of claim 1, the instructions to compare the plurality of predefined editable objects to the target editable object further comprising instructions that, when executed by the at least one processor, cause the at least one processor to perform operations to compare at least one of a data size, a row count, a column count, a data value, a category, or text content.

6. The system of claim 1, the instructions to apply the style to the target editable object further comprising instructions that, when executed by the at least one processor, cause the at least one processor to perform operations to alter a current display characteristic of the target editable object to match the at least one visual display characteristic.

7. A computer-implemented method comprising:
obtaining a target editable object associated with a first data set, from a presentation computer application, the target editable object;
calculating a similarity measure for a plurality of predefined editable objects by comparing the plurality of predefined editable objects to the target editable object, each predefined editable object of the plurality of predefined editable objects associated with a second data set, wherein the similarity is measured based on data of the first data set and the second data set, semantic information associated with the first data set and the second data set, or categories of the first data set and the second data set;
identifying one or more predefined editable objects from the plurality of predefined editable objects based on a similarity measurement of the one or more predefined editable objects being outside a threshold similarity measure;
extracting a style of the one or more predefined editable objects by a style parser of a neural network;
outputting the one or more predefined editable objects in a user interface of the presentation computer application; and
upon receipt of a selection of the one or more predefined editable objects, applying the style of the one or more predefined editable objects to the target editable object by a style adapter of the neural network in an application window of the presentation computer application, wherein the style of the one or more predefined editable objects comprises at least one visual display characteristic.

8. The computer-implemented method of claim 7, further comprising generating the target editable object from the data set.

9. The computer-implemented method of claim 7, wherein the target editable object is an electronic chart that comprises a visualization of the data set.

10. The computer-implemented method of claim 7, wherein a predefined editable object of the plurality of predefined editable objects has a respective style.

11. The computer-implemented method of claim 7, wherein comparing the plurality of predefined editable objects to the target editable object includes comparing at least one of a data size, a row count, a column count, a data value, a category, or text content.

12. The computer-implemented method of claim 7, wherein applying the style to the target editable object comprises altering a current display characteristic of the target editable object to match the at least one visual display characteristic.

13. At least one non-transitory machine-readable medium comprising instructions that, when executed by at least one processor, cause the at least one processor to perform operations to:
obtain a target editable object associated with a first data set, from a presentation computer application, the target editable object;
calculate a similarity measure for a plurality of predefined editable objects through comparison of the plurality of predefined editable objects to the target editable object, each predefined editable object of the plurality of predefined editable objects associated with a second data set, wherein the similarity is measured based on data of the first data set and the second data set, semantic information associated with the first data set and the second data set, or categories of the first data set and the second data set;
identify one or more predefined editable objects from the plurality of predefined editable objects based on a similarity measurement of the one or more predefined editable objects being outside a threshold similarity measure;
extracting a style of the one or more predefined editable objects by a style parser of a neural network;
output the one or more predefined editable objects in a user interface of the presentation computer application; and
upon receipt of a selection of the one or more predefined editable objects, apply the style of the one or more predefined editable objects to the target editable object by a style adapter of the neural network in an application window of the presentation computer application, wherein the style of the one or more predefined editable objects comprises at least one visual display characteristic.

14. The at least one non-transitory machine-readable medium of claim 13, further comprising instructions that, when executed by the at least one processor, cause the at least one processor to perform operations to generate the target editable object from the data set.

15. The at least one non-transitory machine-readable medium of claim 13, wherein the target editable object is an electronic chart that comprises a visualization of the data set.

16. The at least one non-transitory machine-readable medium of claim 13, wherein a predefined editable object of the plurality of predefined editable objects has a respective style.

17. The at least one non-transitory machine-readable medium of claim 13, the instructions to compare the plurality of predefined editable objects to the target editable object further comprising instructions that, when executed by the at least one processor, cause the at least one processor to perform operations to compare at least one of a data size, a row count, a column count, a data value, a category, or text content.

18. The at least one non-transitory machine-readable medium of claim 13, the instructions to apply the style to the target editable object further comprising instructions that, when executed by the at least one processor, cause the at least one processor to perform operations to alter a current display characteristic of the target editable object to match the at least one visual display characteristic.

* * * * *